(12) United States Patent
Nachnani et al.

(10) Patent No.: US 8,855,106 B1
(45) Date of Patent: Oct. 7, 2014

(54) SYSTEM AND PROCESS FOR REALTIME/NEARTIME CALL ANALYTICS WITH SPEAKER SEPARATION

(75) Inventors: Harkishin Nachnani, San Jose, CA (US); Juan Vasquez, San Jose, CA (US)

(73) Assignee: Google Inc., Mountain View, CA (US)

( * ) Notice: Subject to any disclaimer, the term of this patent is extended or adjusted under 35 U.S.C. 154(b) by 519 days.

(21) Appl. No.: 13/253,631

(22) Filed: Oct. 5, 2011

(51) Int. Cl.
*H04L 12/66* (2006.01)

(52) U.S. Cl.
USPC .......................................... 370/352

(58) Field of Classification Search
CPC .......................... H04L 29/06028; H04L 12/66
USPC .................................................. 370/206, 352
See application file for complete search history.

(56) References Cited

U.S. PATENT DOCUMENTS

| | | | |
|---|---|---|---|
| 6,934,756 B2 * | 8/2005 | Maes | 709/227 |
| 8,358,600 B2 * | 1/2013 | Bevin et al. | 370/267 |
| 8,358,765 B1 * | 1/2013 | Whitten et al. | 379/211.04 |
| 8,559,944 B2 * | 10/2013 | Ophir et al. | 455/432.3 |
| 2002/0001302 A1 * | 1/2002 | Pickett | 370/352 |
| 2003/0002477 A1 * | 1/2003 | Israel et al. | 370/352 |
| 2003/0002481 A1 * | 1/2003 | Laursen et al. | 370/352 |
| 2006/0262920 A1 * | 11/2006 | Conway et al. | 379/265.02 |
| 2006/0265090 A1 * | 11/2006 | Conway et al. | 700/94 |
| 2008/0240376 A1 * | 10/2008 | Conway et al. | 379/88.03 |
| 2008/0260137 A1 * | 10/2008 | Poi et al. | 379/212.01 |
| 2009/0213844 A1 * | 8/2009 | Hughston | 370/352 |
| 2010/0306154 A1 * | 12/2010 | Poray et al. | 706/47 |
| 2011/0010173 A1 * | 1/2011 | Scott et al. | 704/235 |
| 2011/0125498 A1 * | 5/2011 | Pickering et al. | 704/246 |
| 2011/0188648 A1 * | 8/2011 | Pickering et al. | 379/211.02 |
| 2011/0243311 A1 * | 10/2011 | Aldrich | 379/88.14 |
| 2011/0282739 A1 * | 11/2011 | Mashinsky et al. | 705/14.53 |
| 2012/0076279 A1 * | 3/2012 | Vasquez et al. | 379/88.04 |

* cited by examiner

*Primary Examiner* — Guang Li
(74) *Attorney, Agent, or Firm* — Foley and Lardner LLP; John D. Lanza

(57) ABSTRACT

A system, method, and program product for realtime/neartime call analytics, the method comprising: receiving an inbound call connection; capturing a destination network address; initiating placement of a call; capturing first data of the initiating party and converting the first data to first data packets with time stamps and a first designation; creating a first audio stream; sending the first audio stream of audio data packets to an audio analytics service; capturing second data including audio data of the destination party and converting the second data to second data packets with time stamps and a second designation; creating a second audio stream; and sending the second audio stream of audio data packets to the audio analytics service.

20 Claims, 3 Drawing Sheets

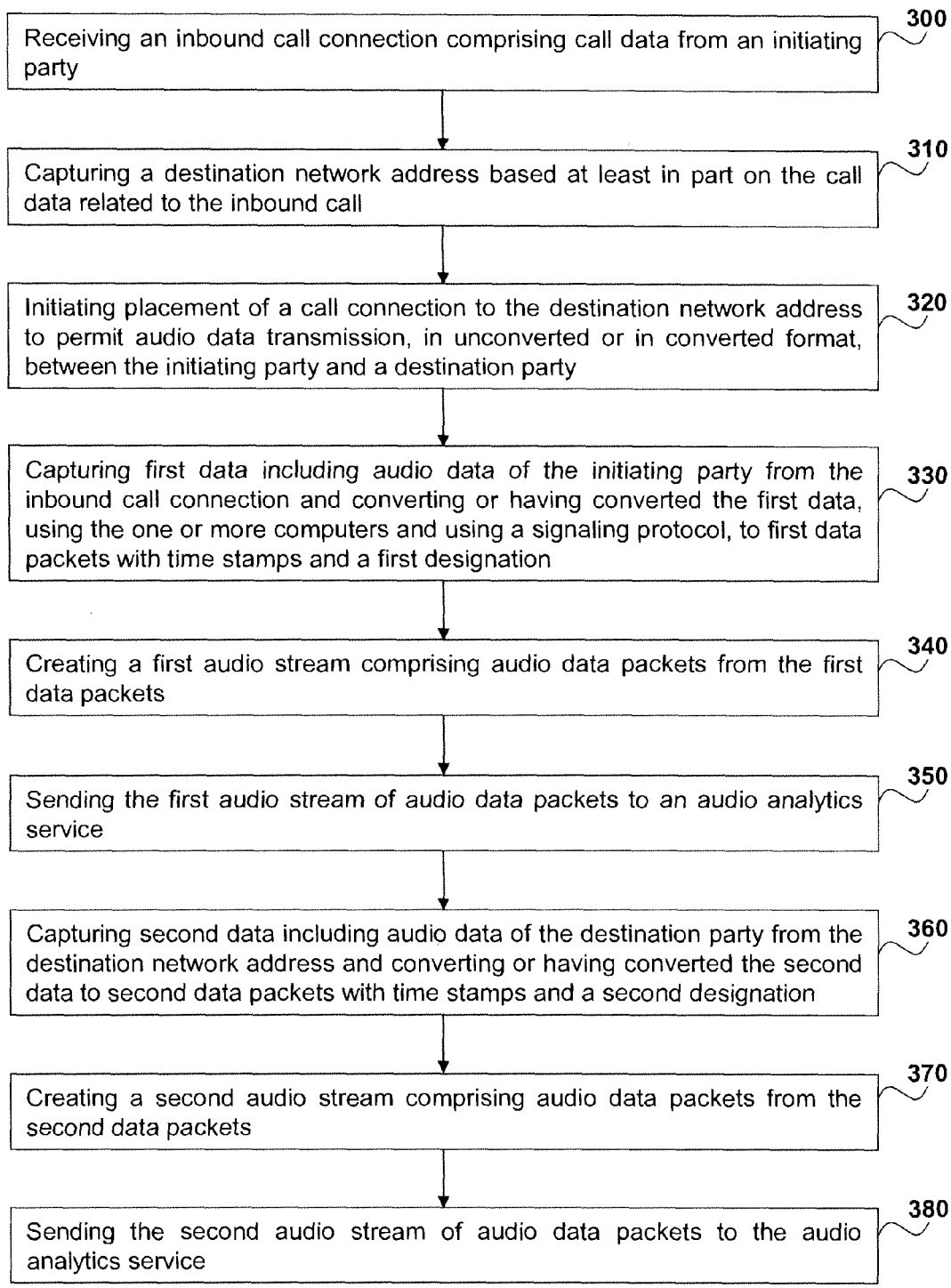

SYSTEM AND PROCESS FOR REALTIME/NEARTIME CALL ANALYTICS WITH SPEAKER SEPARATION

BACKGROUND OF THE INVENTION

Capturing telephone calls for subsequent data mining is difficult, slow and expensive. Additionally, difficulties frequently arise in identifying, from captured audio data, which party is speaking.

SUMMARY OF THE INVENTION

In embodiments of the inventions, a method and program product is disclosed for realtime/neartime call analytics. In embodiments of the method, an inbound call connection is received comprising call data from an initiating party, using one or more computers and a network. A destination network address is captured based at least in part on the call data related to the inbound call. A call connection to the destination network address is then initiated using the one or more computers, to permit audio data transmission, in unconverted or in converted format, between the initiating party and a destination party. First data of the initiating party including audio data is captured, using the one or more computers, from the inbound call connection, and converted or having converted the first data, using the one or more computers and using a signaling protocol, to first data packets with time stamps and a first designation. A first audio stream comprising audio data packets from the first data packets is created, using the one or more computers. The first audio stream of audio data packets is sent, using the one or more computers, to an audio analytics service. Second data including audio data of the destination party from the destination network address is captured, using the one or more computers, and converted or having converted, using the one or more computers and the signaling protocol, to second data packets with time stamps and a second designation. A second audio stream comprising audio data packets from the second data packets is created, using the one or more computers. The second audio stream of audio data packets is sent, using the one or more computers, to the audio analytics service.

In embodiments, a system for realtime/neartime call analytics, is disclosed. The system comprises a network connection, and one or more computers. The one or more computers may be configured to receive an inbound call connection comprising call data from an initiating party, using one or more computers and a network, and capture a destination network address based at least in part on the call data related to the inbound call. The one or more computers may be further configured to initiate placement of a call connection to the destination network address to permit audio data transmission, in unconverted or in converted format, between the initiating party and a destination party. The one or more computers may be further configured to capture first data from the inbound call connection including audio data of the initiating party and convert or have converted the first data, using the one or more computers and using a signaling protocol, to first data packets with time stamps and a first designation, and to create a first audio stream comprising audio data packets from the first data packets, and to send, using the one or more computers, the first audio stream of audio data packets to an audio analytics service. The one or more computers may be further configured to capture second data including audio data of the destination party from the destination network address and convert or having converted the second data, using the one or more computers and using the signaling protocol, to second data packets with time stamps and a second designation. The one or more computers may be further configured to create a second audio stream comprising audio data packets from the second data packets, and send, using the one or more computers, the second audio stream of audio data packets to the audio analytics service.

BRIEF DESCRIPTION OF THE DRAWINGS

The above and related objects, features and advantages of the present invention, will be more fully understood by reference to the following detailed description of the exemplary embodiments of the present invention, when taken in conjunction with the following exemplary figures, wherein:

FIG. 3 is a schematic flow chart of an exemplary method in accordance with embodiments of the invention.

DETAILED DESCRIPTION OF THE PREFERRED EMBODIMENTS

The present invention generally relates to a system, method and program product for facilitating audio transcription of audio calls with accurate speaker separation.

Figure 1:
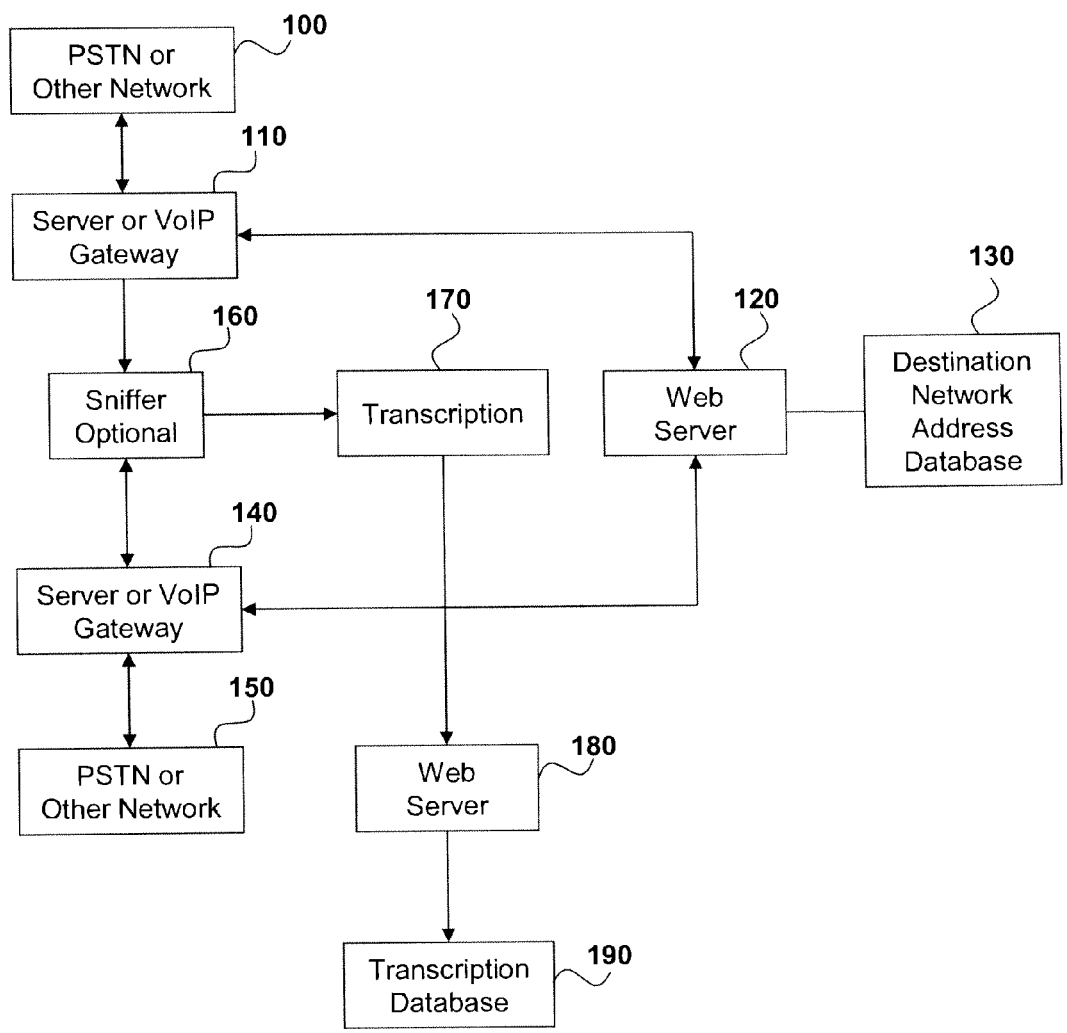
FIG. 1 is a schematic block diagram of an exemplary system in accordance with embodiments of the invention.

Referring to FIG. 1, an exemplary embodiment of the invention is illustrated for facilitating audio call transcription. In the description to follow, the servers, VOIP gateways, sniffer circuits, and other blocks, are implemented in embodiments, on one or more computers, that are configured by programming and/or hardwiring, to be capable of performing the described operations. In embodiments, the one or more computers used to implement the various blocks may be distributed.

An audio call may be received from a network 100. In embodiments, the network 100 may comprise a public switched telephone network (PSTN) by itself or in combination with one or more other networks. In embodiments, the network 100 may comprise a wireless telephone network, by itself or in combination with one or more other networks. In embodiments, the network 100 may comprise a Voice Over Internet Protocol (VOIP) call by itself or in combination with one or more other networks. In embodiments, the network 100 may comprise a video call by itself or in combination with one or more other networks.

A server and/or a Voice Over Internet Protocol (VOIP) system 110, embodied on the one or more computers, receives the audio call. In embodiments, this reception may be at a predetermined number, e.g., a 1-800 number, for example. In embodiments, this inbound call may be an analog audio call, a Voice over Internet Protocol (VOIP) call, or a video call, to name a few.

A process is run to capture a destination network address, e.g., a telephone number or a web address, based at least in part on the call data related to the inbound call. In embodiments, this capture of the destination network address may be accomplished by accessing a database 130 holding pre-configured destination network addresses, via a connection through a web or other server 120. For example, a call to a 1-800 number assigned to a Company A, may have a pre-configured destination telephone number for a Company B. In other embodiments, the capture of the destination network address may be accomplished by the server 110. This server capture may occur when header data or other data is received in an electronic handshake operation used in making connection to the server 110, before any audio data is received. For example, the PSTN may have retrieved a destination network address and added it to a label which it placed in a Session Initiation Protocol (SIP) header for the call, which may be read by the server 110. In some embodiments in order to address privacy concerns, when an inbound call is first received and the number for the destination network address to which to make the call connection is being determined, the system can place an audio or other message on the line stating that this call may be recorded. In embodiments, a dtmf or speech enabled opt-out may also be provided. Where a company does not wish to provide an opt out, the message may inform the user that if he/she does not wish to be recorded, the user can hang up. In some embodiments, the caller ID or other information identifying the user may be compared to a listing or to a user type (e.g., a number listing for a private individual rather than a number assigned to a company), and determine based at least in part on this information, not to forward the call for be transcription. In embodiments, privacy concerns may also be addressed by encrypting the transcriptions for all calls, or for calls that meet one or more criteria, such as calls from individuals on a given list or certain user types (e.g., private individuals). In many cases, the transcription will not be maintained in a database, so that protection of the delivery method for the transcription may be acceptable. In those cases where the transcriptions are stored in a database, the transcriptions may be stored in encrypted form and/or there may be controlled access only on a need-to-know basis. Note also that for many data mining applications, large samples are needed, but the data may be anonimized. Thus, in embodiments, since the transcription documents may be stored as text documents, a script may be run to annonymize the data, e.g., remove names, account numbers, phone and other network address numbers, and other identifying information.

A process is run to initiate placement of a call connection to the destination network address to permit audio data transmission, in unconverted or in converted format, between the initiating party and a destination party at the destination network address. In embodiments, this process may be run by a server or VOIP gateway 140, on the one or more computers. For example, a SIP invite signal may be sent to the destination network address and an audio path negotiated with a PSTN or other network 150.

A process is run to capture first data of the initiating party including audio data, from the inbound call connection, and convert or having converted that first data, using a signaling protocol, to first data packets with time stamps and a first designation. In embodiments, the server 110 may capture the first data of the initiating party including audio data, from the inbound call connection, and convert or have converted that first data, using a signaling protocol, to first data packets with time stamps and a first designation. In embodiments, the signaling protocol in the converting step comprises Voice Over Internet Protocol (VOIP)/signaling protocol. By way of example, the signaling protocol in the converting step may comprise one selected from the group of Session Initiation Protocol (SIP), H.323 and IMS (IP Multimedia Subsystem).

The signaling protocol packets resulting from the converting process, in embodiments, will each include time stamp data and a designation indicating that the packet is based on data originating from one direction, e.g., the initiating caller. For example, real time transport protocol (RTP) in the transport layer may be used to add a time stamp for each data packet, and a first designation such as an originator or a destination address may be included, from which an identification of the speaker may be determined.

A process is run by the one or more computers, to create a first audio stream comprising audio data packets from the first data packets. The process detects audio data packets, for example, based on information in the packet headers, and forms these audio packets into a first audio stream. In embodiments, an electronic sniffer 160, comprising software or firmware programming implemented on the one or more computers and using a physical network tap, may examine network traffic at a point between the connection between the server 110 and the server 140, make a copy of the audio data examined, and form the first audio stream. In other embodiments, this operation may be performed by the server 110.

A process is run to send, using the one or more computers, the first audio stream of audio data packets to an audio analytics service 170. By way of example, the transmission of the first audio stream (Party A) to the audio analytics service 170 may be performed by the server 110, and/or the electronic sniffer 160. In embodiments, the audio analytics service may comprise computers of a transcription service.

A process is run to capture second data from the destination party including audio data of the destination party from the destination network address, and convert or having converted that second data, using a signaling protocol, to second data packets with time stamps and a second designation. In embodiments, the server 140 may capture the second data of the destination Party B including audio data, from the call connection, and convert or have converted that second data, using a signaling protocol, to second data packets with time stamps and a second designation. In embodiments, the signaling protocol in the converting step may comprise Voice Over Internet Protocol (VOIP)/signaling protocol. As noted, in embodiments the signaling protocol in the converting step may comprise one selected from the group of Session Initiation Protocol (SIP), H.323 and IMS (IP Multimedia Subsystem). The signaling protocol packets resulting from the converting process, in embodiments, will each include time stamp data and a designation indicating that the packet is based on data originating from one direction, e.g., the initiating caller. For example, real time transport protocol (RTP) in the transport layer may be used to add a time stamp for each data packet, and a first designation such as an originator or a destination address may be included, from which an identification of the speaker may be determined.

A process is run by the one or more computers, to create a second audio stream comprising audio data packets from the second data packets. The process detects audio data packets, for example, based on information in the packet headers, and forms these audio packets into the second audio stream. In embodiments, the electronic sniffer 160, comprising software or firmware programming implemented on the one or more computers and using a physical network tap, may examine network traffic at a point between the connection between the server 110 and the server 140, make a copy of the audio data examined, and form the second audio stream. In other embodiments, this operation may be performed by the server 140.

A process is run to send, using the one or more computers, the second audio stream of audio data packets to the audio analytics service 170 for transcription. By way of example, the transmission of the second audio stream (Party B) to the audio analytics service 170 may be performed by the server 140, and/or the electronic sniffer 160.

The transcription operation uses the time stamps of the audio data packets in the first and second audio streams to put the audio sounds together in the correct sequence and uses the first and the second designations to identify in the transcription the speaker and/or the company and/or other entity associated with the particular transcribed audio sound.

In embodiments, the transcription data may be forwarded on a network to a transcription database 190, via a web or other server 180.

Figure 2:
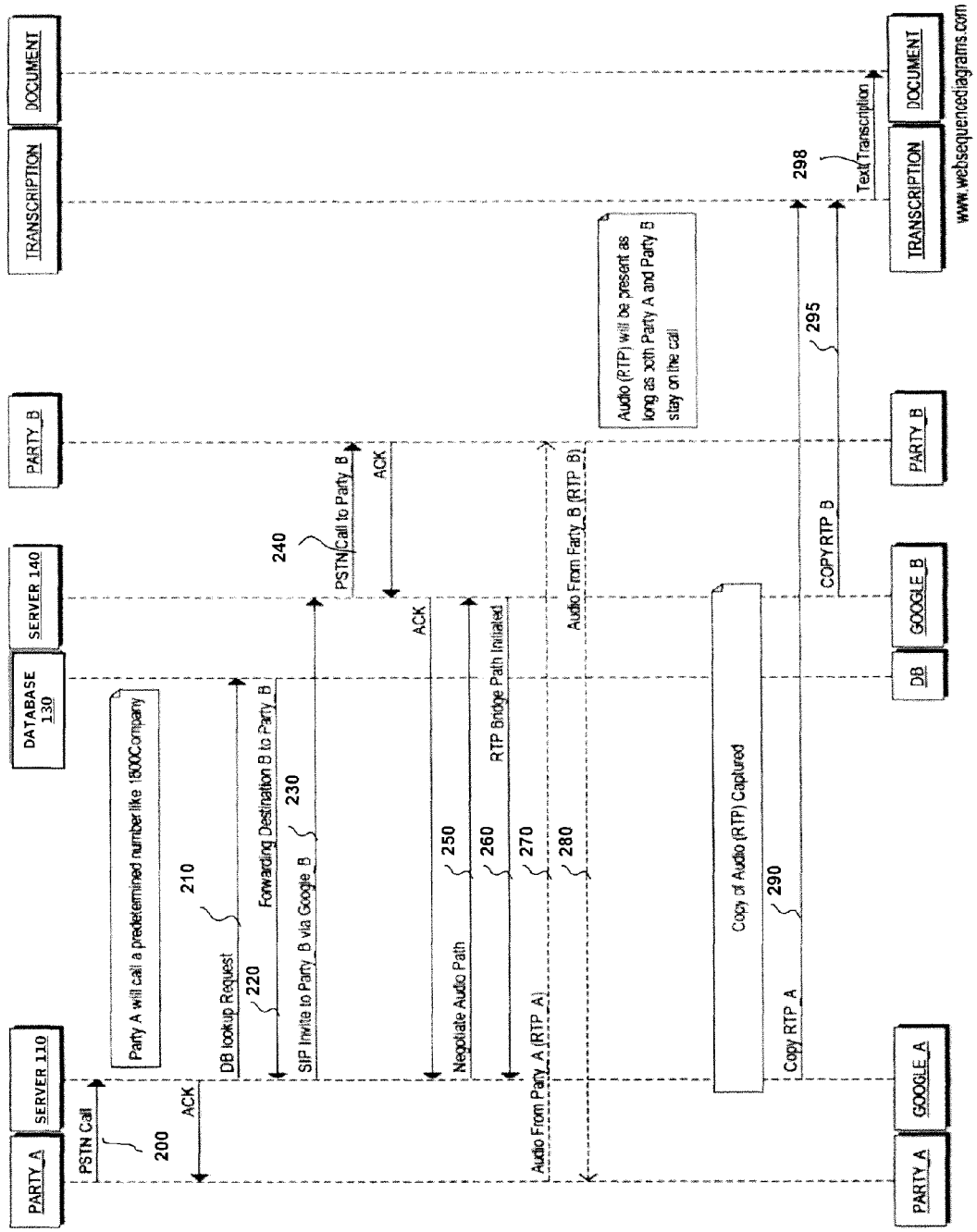
FIG. 2 is an exemplary sequence diagram in accordance with embodiments of the invention.

FIG. 2 illustrates an exemplary sequence for the foregoing set of operations. An initiating party A calls a predetermined telephone number, e.g., a 1-800 number, to obtain transcription services, and a call connection 200 is made to the server 110. The server 110 initiates a lookup request signal 210 to the database 130, to capture a destination network address, e.g., a telephone number of a destination party. The captured destination network address is then forwarded by signal 220 to the server 110.

A SIP invite is then sent by signal 230 to the server 140. The server 140 initiates a call 240 via a PTSN or other network to the destination party B. An audio path is then negotiated 250 via a handshaking protocol, and an real time transport (RTP) bridge path is initiated 260. Then audio from initiating party A is sent 270 to the destination party B, and audio from the destination party B is sent 280 to the initiating party A.

An first audio stream of audio data packets (e.g., an RTP copy), is then sent 290 from the server 110 to the audio analytics service 170. A second audio stream of audio data packets (e.g., an RTP copy), is sent 295 from the server 140 to the audio analytics service 170. A transcription is then sent 298 to the database 190. Note that the analytics service 170 may be an internal service implemented by programming on the one or more computers, and/or may be transmitted to a third party service.

FIG. 3 illustrates a method embodiment of the invention. Block 300 comprises an operation of receiving an inbound call connection comprising call data from an initiating party, using one or more computers and a network.

Block 310 comprises an operation of capturing a destination network address based at least in part on the call data related to the inbound call.

Block 320 comprises an operation of initiating placement, using the one or more computers, of a call connection to the destination network address to permit audio data transmission, in unconverted or in converted format, between the initiating party and a destination party.

Block 330 comprises an operation of capturing first data of the initiating party including audio data, using the one or more computers, from the inbound call connection and converting or having converted the first data, using the one or more computers and using a signaling protocol, to first data packets with time stamps and a first designation.

Block 340 comprises an operation of creating, using the one or more computers, a first audio stream comprising audio data packets from the first data packets.

Block 350 comprises an operation of sending, using the one or more computers, the first audio stream of audio data packets to an audio analytics service.

Block 360 comprises an operation of capturing, using the one or more computers, second data including audio data of the destination party from the destination network address and converting or having converted the second data, using the one or more computers and using the signaling protocol, to second data packets with time stamps and a second designation.

Block 370 comprises an operation of creating, using the one or more computers, a second audio stream comprising audio data packets from the second data packets.

Block 380 comprises an operation of sending, using the one or more computers, the second audio stream of audio data packets to the audio analytics service.

As noted, in embodiments, the one or more computers may capture the destination network address by accessing one or more databases to obtain the destination network address. In embodiments, the one or more computers may capture the destination network address by obtaining the destination network address from data received with the inbound call.

As noted, in embodiments, the one or more computers may convert or having converted the first data including the audio data of the initiating party for transmission to the destination network address in a different form than was received on the inbound call connection.

In embodiments, at least one of the creating a first audio stream operation and the creating a second audio stream operation may comprise using a physical network tap to detect and create the audio stream of audio data packets.

In embodiments, the creating a first audio stream operation may comprise a server that received the inbound call connection detecting and creating the first audio stream of audio data packets.

In embodiments, the creating a second audio stream operation may comprise a server that initiated the connection of the inbound call to the destination network address detecting and creating the second audio stream of audio data packets.

In embodiments, the one or more computers may be configured to provide the audio analytics service to obtain a transcription of an audio conversation occurring between the initiating party and a destination party at the pre-configured destination network address, with accurate speaker separation in realtime/neartime, and to store the transcription in one or more transcription databases.

In embodiments, the one or more computers may be configured to receive a plurality of transcriptions from the audio analytics service and to cause storage in one or more databases 130. In embodiments, the one or more computers may be further configured to perforin data mining of one or more of the transcriptions stored in the database 130, based on one or more parameters provided by a requestor. In embodiments, inbound calls to a company may be data-mined for selected word content, and/or the word content in inbound call transcriptions may be categorized and the number of occurrences in each category determined and communicated electronically or otherwise.

Embodiments of the invention may be useful for transcribing calls to telephone carriers, to law enforcement telephone lines, security telephone lines, enterprise reception lines, customer service lines, to name a few.

Embodiments of the invention may be used as part of another online service, wherein an embodiment of the present invention may be activated for facilitating transcription of a telephone conversation by a click or other selection command.

The one or more computers may comprise one or more processors, that in some embodiments, may be coupled with a bus, and may be configured to process and handle information and execute instructions. A main memory, such as a Random Access Memory (RAM) or other dynamic storage device, may be coupled to the bus, for storing information and instructions to be executed by the one or more processors. The main memory also may be used for storing temporary variables or other intermediate information during execution of instructions by the one or more processors. The one or more processors may be configured for executing one or more sequences of computer-readable instructions contained in the main memory. Such instructions may be read into the main memory from another computer-readable medium, such as a ROM, or other storage device. Execution of the sequences of instructions contained in the main memory will cause the one or more processors to perform the process steps described herein. It should be appreciated that embodiments may perform fewer or additional processes as compared to those described herein. As noted, the one or more processors may be arranged in a multi-processing arrangement. Alternatively, hardwired circuitry may be used in place of or in combination with software instructions to implement the invention. Thus, embodiments of the invention are not limited to any specific combination of hardware circuitry and software.

Embodiments within the scope of the present invention include program products comprising machine-readable media with machine-executable instructions or data structures stored thereon. Such machine-readable media can be any available storage media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other storage medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers (including mobile devices) having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations, including personal computers, hand-held devices such as mobile phones and other PDA appliances, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for realtime/neartime call analytics, comprising:

receiving, by one or more computers via a network, an inbound call connection comprising inbound call data from an initiating party;

capturing a destination network address based on the inbound call data;

connecting, by the one or more computers, the inbound call to the destination network address to permit audio data transmission;

capturing, by the one or more computers, first data of the initiating party including audio data from the inbound call connection and producing from the first data, by the one or more computers via a Voice Over Internet Protocol (VOIP) signaling protocol, first time-stamped data packets including a first designation;

creating, by the one or more computers, a first audio stream comprising audio data packets from the first data packets;

using the first data of the initiating party to identify the initiating party and to determine, based on the identity of the initiating party, to generate a first transcript of the first audio stream;

sending, by the one or more computers responsive to the determination to generate the first transcript, the first audio stream to an audio analytics service to transcribe the first audio stream;

capturing, by the one or more computers from the destination network address, second data including audio data of the destination party and producing, by the one or more computers via the Voice Over Internet Protocol (VOIP) signaling protocol, second time-stamped data packets including a second designation;

creating, by the one or more computers, a second audio stream comprising audio data packets from the second data packets;

using the second data of the destination party to identify the destination party and to determine, based on the identity of the destination party, to generate a second transcript of the second audio stream; and sending, by the one or more computers responsive to the determination to generate the second transcript, the second audio stream to the audio analytics service to transcribe the second audio stream.

2. The method as defined in claim 1, wherein the inbound call is one selected from the group of an analog audio call, a Voice Over Internet Protocol (VOIP) call, and a video call.

3. The method as defined in claim 1, wherein the capturing a destination network address comprises accessing one or more databases to obtain the destination network address.

4. The method as defined in claim 1, wherein the capturing a destination network address comprises obtaining the destination network address from a data received with the inbound call.

5. The method as defined in claim 1, wherein the signaling protocol comprises one selected from the group of Session Initiation Protocol (SIP), H323 and IMF.

6. The method as defined in claim 1, comprising:
converting or having converted the first data including the audio data of the initiating party for transmission to the destination network address in a different form than was received on the inbound call connection.

7. The method as defined in claim 1, wherein at least one of the inbound call connection and the call connection to the destination network address is on a public switched telephone network (PSTN).

8. The method as defined in claim 1, wherein at least one of the creating a first audio stream step and the creating a second audio stream step comprises using a physical network tap to detect and create the audio stream of audio data packets.

9. The method as defined in claim 1, wherein the creating a first audio stream step comprises a server that received the inbound call connection detecting and creating the first audio stream of audio data packets.

10. The method as defined in claim 1, wherein the creating a second audio stream step comprises a server that initiated the connection of the inbound call to the destination network address detecting and creating the second audio stream of audio data packets.

11. The method as defined in claim 1, further comprising:
the audio analytics service providing a transcription of an audio conversation occurring between the initiating party and a party at the pre-configured destination network address, with accurate speaker separation in realtime/neartime; and
storing the transcription in one or more transcription databases.

12. The method as defined in claim 1, further comprising:
storing a plurality of transcriptions from the audio analytics service in one or more databases; and
performing data mining of one or more of the transcriptions stored in the one or more databases, based at least in part on one or more parameters provided by a requestor.

13. A system for realtime/neartime call analytics, comprising:
a network connection; and
one or more computers configured to:
receive an inbound call connection comprising inbound call data from an initiating party via the network connection;
capture a destination network address based on the inbound call data;
connect the inbound call to the destination network address to permit audio data transmission;
capture first data from the inbound call connection including audio data of the initiating party and producing from the first data, via a Voice Over Internet Protocol (VOIP) signaling protocol, first time-stamped data packets including a first designation;
create a first audio stream comprising audio data packets from the first data packets;
use the first data of the initiating party to identify the initiating party and to determine, based on the identity of the initiating party, to generate a first transcript of the first audio stream;
send, in response to the determination to generate the first transcript, the first audio stream to an audio analytics service to transcribe the first audio stream;
capture, from the destination network address, second data including audio data of the destination party and producing, via the Voice Over Internet Protocol (VOIP) signaling protocol, second time-stamped data packets including a second designation;
create a second audio stream comprising audio data packets from the second data packets;
use the second data of the destination party to identify the destination party and to determine, based on the identity of the destination party, to generate a second transcript of the second audio stream; and
send, in response to the determination to generate the second transcript, the second audio stream to the audio analytics service to transcribe the second audio stream.

14. The system as defined in claim 13, further comprising the one or more computers configured to provide the audio analytics service to obtain a transcript document of an audio conversation occurring between the initiating party and a party at the pre-configured destination network address, with accurate speaker separation in realtime/neartime.

15. The system as defined in claim 13, further comprising:
the one or more computers configured to provide the audio analytics service to obtain a transcription of an audio conversation occurring between the initiating party and a party at the pre-configured destination network address, with accurate speaker separation in realtime/neartime, and to cause storage of the transcription in one or more transcription databases.

16. The system as defined in claim 13, further comprising:
the one or more computers configured to cause storage of a plurality of transcriptions from the audio analytics service in one or more databases; and configured to perform data mining of one or more of the transcriptions stored in the one or more databases, based at least in part on one or more parameters provided by a requestor.

17. The system as defined in claim 13, further comprising:
one or more databases holding destination network addresses.

18. The system as defined in claim 13, further comprising a physical network tap configured to detect and create at least one selected from the group of the first audio stream of audio data packets and the second audio stream of audio data packets.

19. The system as defined in claim 13, further comprising one or more servers configured to detect and create at least one selected from the group of the first audio stream of audio data packets and the second audio stream of audio data packets.

20. A method for realtime/neartime call analytics, comprising:

receiving, by one or more computers via a network, an inbound call connection comprising inbound call data from an initiating party;

capturing a destination network address based on the inbound call data;

connecting, by the one or more computers, the inbound call to the destination network address to permit audio data transmission;

capturing, by the one or more computers, first data of the initiating party including audio data from the inbound call connection and producing from the first data, by the one or more computers via a Voice Over Internet Protocol (VOIP) signaling protocol, first time-stamped data packets including a first designation;

creating, by the one or more computers, a first audio stream comprising audio data packets from the first data packets;

using the first data of the initiating party to identify the initiating party and to determine, based on the identity of the initiating party, to generate a first transcript of the first audio stream;

sending, by the one or more computers responsive to the determination to generate the first transcript, the first audio stream to an audio analytics service to transcribe the first audio stream;

capturing, by the one or more computers from the destination network address, second data including audio data of the destination party and producing, by the one or more computers via the Voice Over Internet Protocol (VOIP) signaling protocol, second time-stamped data packets including a second designation;

creating, by the one or more computers, a second audio stream comprising audio data packets from the second data packets;

using the second data of the destination party to identify the destination party and to determine, based on the identity of the destination party, to generate a second transcript of the second audio stream; and sending, by the one or more computers responsive to the determination to generate the second transcript, the second audio stream to the audio analytics service to transcribe the second audio stream;

storing the first and second transcripts in one or more transcription databases; and performing data mining of at least one of the first and second transcripts based on one or more parameters provided by a requestor.

\* \* \* \* \*